United States Patent [19]

Zeigler

[11] Patent Number: 4,561,618
[45] Date of Patent: Dec. 31, 1985

[54] STABILIZING FOOT FOR AN EXHIBIT FRAME

[76] Inventor: Theodore R. Zeigler, 9923 Indian Queen Point Rd., Oxon Hill, Md. 20022

[21] Appl. No.: 552,720

[22] Filed: Nov. 17, 1983

[51] Int. Cl.$^4$ .................................. F16M 11/38
[52] U.S. Cl. ................................ 248/166; 248/188.8
[58] Field of Search .................. 248/188.8, 677, 158, 248/127, 166, 436; 160/351; 40/606, 610, 612

[56] References Cited

U.S. PATENT DOCUMENTS

| | | | |
|---|---|---|---|
| 300,930 | 6/1884 | White | 160/351 X |
| 346,487 | 8/1886 | Manley | 160/351 |
| 973,936 | 10/1910 | Graves | 160/351 X |
| 1,408,079 | 2/1922 | Davis et al. | 160/351 X |
| 1,566,316 | 12/1925 | Davis | 40/606 |
| 2,432,047 | 12/1947 | Sterick et al. | 160/351 X |
| 3,583,466 | 6/1971 | Dreyer | 160/351 |
| 3,975,850 | 8/1976 | Giaume | 40/606 |
| 4,085,789 | 4/1978 | Steiner et al. | 160/351 X |
| 4,461,491 | 7/1984 | Eklund | 248/188.8 X |

Primary Examiner—J. Franklin Foss
Attorney, Agent, or Firm—John P. Snyder

[57] ABSTRACT

This disclosure relates to a stabilizing foot for an exhibit frame of the type formed of a plurality of pivotally interconnected rods and hubs with many of the hubs having openings therein, the frame being capable of movement between a collapsed position at which the rods are generally in side-by-side relationship in a bundle and in an errected position in which the exhibit frame is a relatively narrow and tall structure, the foot being defined by an elongated base disposed in underlying transverse relationship to the structure and adjacent openings in a pair of the hubs, a pair of ears disposed in upstanding spaced relationship relative to the base, each of the ears having an opening, and a pin passing through the openings of the ears and the openings of the hubs for connecting the ears and thereby connecting the base to the exhibit frame through the hubs thereof.

9 Claims, 4 Drawing Figures

STABILIZING FOOT FOR AN EXHIBIT FRAME

The present invention is particularly directed to a stabilizing foot or a plurality of such feet which are preferably disposed in transverse relationship to an exhibit frame of the type disclosed in copending application Ser. Nos. 403,363 and 409,435 filed July 30, 1982 and August 19, 1982, respectively, in the name of Theodore R. Zeigler. The exhibit frame is constructed from a plurality of tubular rods which are all pivotally connected to each other and pairs of such pivotally interconnected rods are generally moved between positions at which the rods are in side-by-side relationship when the exhibit frame is collapsed to positions at which the rods define a generally X-shaped pattern when the exhibit frame is in its erected or in-use position. An exhibit frame of this type is generally formed of a plurality of "quads", each of a generally rectangular configuration defined by each pair of hubs with one pair at each corner of the "quad" and another pair of hubs at the center of the "quad". A typical exhibit frame may be formed of a total of nine of such quads or twelve of such quads, but in all cases the exhibit frame is supported on its lowermost relatively narrow edge with the depth or thickness of the frame being established by the distance between the pairs of hubs at each corner. The narrower this distance, the more unstable the exhibit frame since the base is relatively narrow whereas if the distance between the pairs of hubs at each corner is increased, the exhibit frame is somewhat increased in stability. If the exhibit frame is curved as viewed in top plan, it is virtually inherently stable but if it is simply straight or uniplanar, again as viewed in top plan, its stability is at times less than desired, particularly if seated upon an irregular floor or one which might be somewhat soft, as for example, a rug.

In keeping with the present invention, a foot or a plurality of feet are connected to lowermost pairs of selected ones of the apertured hubs at the corners of the lowermost quads of any particular exhibit frame and the stabilizing feet are disposed normal to a vertical plane through the exhibit frame thereby lending stability to the frame which can be substantially increased simply by the particular length of the associated stabilizing foot.

Preferably, in further accordance with this invention, the stabilizing feet are removably secured to the exhibit frame so that the frame can be readily collapsed and paced without interference in an associated cylindrical container while at the same time after the frame has been erected or set-up the feet can be relatively quickly attached thereto by means of a pair of upstanding ears connected to the associated foot with each of the ears having an opening aligned with the openings in the lowermost hubs of the exhibit frame and an appropriate pin passing therethrough to unite the ears to the hubs and, thus, unite the foot to the exhibit frame.

Still another object of this invention is to provide a novel stabilizing foot as aforesaid wherein the pin preferably is threaded and a wing nut or the like is used to quickly secure and remove the foot from an associated frame.

Yet another object of this invention is to provide a novel stabilizing foot as aforesaid in conjunction with means in the form of a graphic panel clip for securing a graphic panel to the exhibit frame, the clip including an opening therethrough, and the pin passing through the opening of the clip for additionally securing the clip to the associated hub of the exhibit frame.

With the above and other objects in view that will hereinafter appear, the nature of the invention will be more clearly understood by reference to the following detailed description, the appended claims and the several views illustrated in the accompanying drawings.

Figure 1:
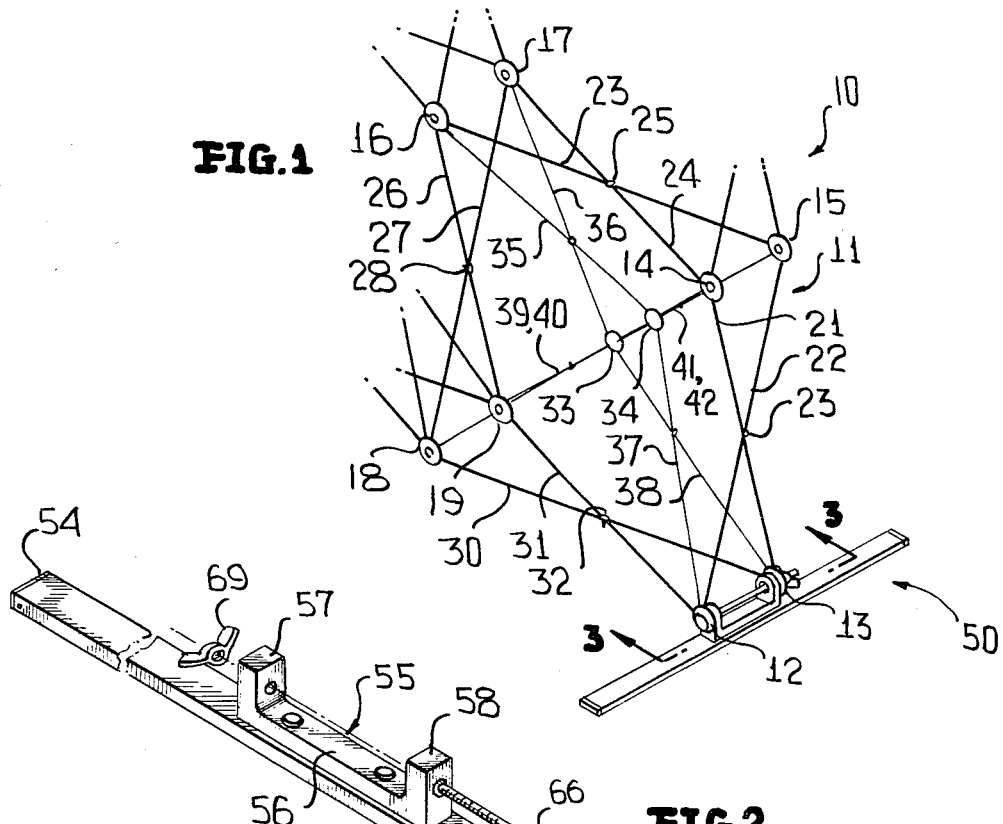
FIG. 1 is a perspective view of an exhibit frame in schematic form, and illustrates one quad of the exhibit frame to a corner of which is defined by a pair of hubs each having an opening is attached a stabilizing foot of the present invention.

Reference is first made to FIG. 1 of the drawing in which an exhibit frame is generally designated by the referenc numeral 10 and though composed of a plurality of identical quads, a single quad 11 is sufficient for understanding the present invention, although reference is made to the two applications earlier noted for further details of the quad 11 and the overall exhibit frame 10.

The quad 11 is of a generally rectangular configuration and four corners thereof are set off by pairs of hubs 12, 13: 14, 15; 16, 17; and 18, 19.

A pair of crossed rods 21, 22 are pivotally connected to each other by a pivot pin 23 and are also connected to the hubs 13, 14 and 12, 15, respectively.

A pair of crossed rods or tubes 23, 24 are pivotally interconnected by a pivot pin 25 with the rod 23 being also pivotally connected to the hubs 15, 16 and the rod 24 being pivotally connected to the hubs 14, 17.

A pair of rods 26, 27 are pivotally connected by a pivot pin 28 with the rod 26 also being pivotally connected to the hubs 16, 19 and the rod 27 being pivotally connected to the hubs 17, 18.

A pair of rods 30, 31 are pivotally connected by a pivot pin 32 with the rod 31 also being pivotally connected to the hubs 19, 12 and the rod 30 being pivotally connected to the hubs 18, 13.

In the erected or set-up position of the exhibit frame 10 and specifically the quad 11 thereof, the rods 23, 24 and 30, 31 occupy generally horizontal planes whereas the rods 26, 27 and 21, 22 occupy generally vertical frames.

Located at the center of the "quad" 11 are unapertured hubs 33, 34. The hubs 33, 34 are each connected to one of four pairs of crossed pivotally connected rods 35, 36; 37, 38; 39, 40; and 41, 42. The pair of rods 35 through 42 are also selectively connected to various ones of the hubs 12 through 19, as is readily evident from FIG. 1, noting that, for example, the rods 35, 36 are connected to the respective hubs 16, 17; the rods 37, 38 to the respective hubs 12, 13; etc. By virtue of this construction, the exhibit frame 10 and remaining of the unillustrated quads identical to the quad 11 can be expanded and collapsed and when expanded or set-up, the exhibit frame rest upon the lowermost ones of the hubs, as, for example, the hubs 12, 13, 18, 19, etc. If the distance between the hubs 18, 19, 16, 17, 14, 15, 12, 13, for example, is relatively deep or great, the stand or frame is relatively stable but if this distance is relative small, the frame depth is relatively narrow and the exhibit frame is relatively unstable, particular when seated upon irregular floors, soft fabric floors, such as carpeting, etc.

In accordance with this invention, stability is afforded the exhibit frame 10 by providing a stabilizing foot 50 formed as a generally narrow elongated tubular rod or body 51 of a hollow construction which is preferably constructed from aluminum. A interior of the elongated element or tube 51 is generally designated by the reference numeral 52, and opposite open ends (unnumbered) of the tube 51 are closed by plastic end caps 53, 54.

Figure 3:
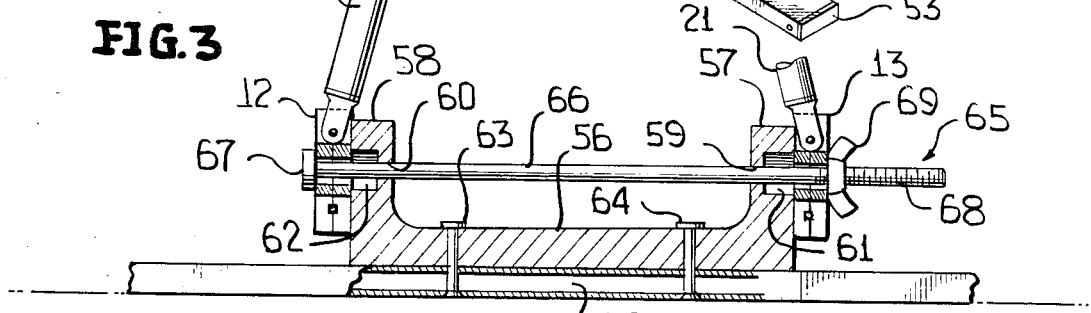
FIG. 3 is an enlarged fragmentary sectional view taken generally along line 3—3 of FIG. 1, and illustrates the manner in which the pin and an associated wing nut are used to secure the ears and, thus, the foot to the hubs of the exhibit frame.

Seated upon the tube or base 51 is a generally U-shaped member 55 of a relatively shallow construction defined by a bight or a leg 56 and a pair of generally parallel upstanding ears 57, 58, each having therethrough an opening or bore 59, 60, respectively counterbored at 61, 62, respectively (FIG. 3). The U-shaped member 55 is secured to the tube or base 51 by a pair of rivets 63, 64, as is most apparent from FIG. 3.

Figure 2:
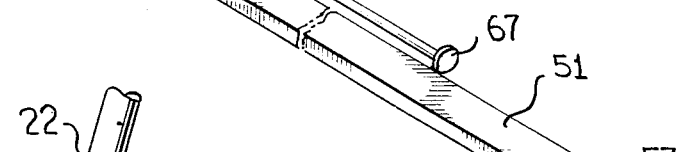
FIG. 2 is a fragmentary perspective view of the stabilizing foot of FIG. 1, and illustrates a generally shallow U-shaped bracket defined in part by upstanding ears having openings through which a pin passes for securing the foot to the hubs of the exhibit frame.

Means generally designated by the reference numeral 65 are provided for connecting the ears 57, 58 to associated ones of the hubs, for example, the hubs 12, 13. The means 65 include an elongated pin 66 of metallic material having an enlarged head 67 and a threaded end 68 to which is threadably secured or removed a wing nut 69. In order to secure the stabilizing foot 50 to the hubs 12, 13, the openings (unnumbered) of the hubs 12, 13 are simply aligned with the openings 60, 62 of the ear 58 and the openings 59, 61 of the ear 57, respectively, and the pin 66 is passed through these openings and secured in place by threading upon the threaded end portion 68 the wing nut 69, as is readily apparent from FIGS. 2 and 3 of the drawing. Removal of the stabilizing foot is obviously effected by an opposite operation. When thus positioned as shown in FIG. 1, the elongated transverse relationship of the stabilizing foot relative to the vertical plane of the exhibit frame 10 lends stability thereto. Of course, though but a single stabilizing foot 50 is shown illustrated in FIG. 1 connected to the hubs 12, 13, it is to be understood that like feet can be attached, for example, to the hubs 18, 19 or any of the remaining hubs, unillustrated, along the lower edge of the exhibit frame 10.

Figure 4:
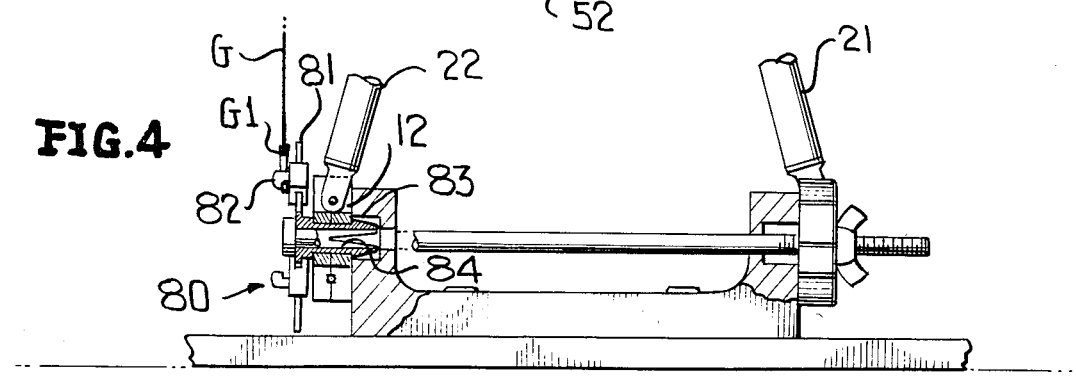
FIG. 4 is a fragmentary sectional view similar to FIG. 3, and additionally illustrates a graphic clip for securing a graphic panel to one of the hubs with the pin also being utilized to secure the graphic clip to the hub.

Reference is now made to FIG. 4 of the drawing wherein identical structure to that shown in FIG. 3 has been provided similar numerals, and the subject matter illustrated in FIG. 4 is identical to that shown in FIG. 3 except for the addition thereto of means 80 for securing graphics G to the hub 12 and, of course, to any of the other remaining hubs to which a stabilizing foot might be attached. The graphic securing means 80 is graphic clip identical in construction to the graphic clips disclosed in Applicant's copending application Ser. No. 403,363 filed on July 30, 1982 and entitled Display Panel Mounting Clip. Suffice it to say that the graphic clip 80 includes a body 81 carrying thereon a plurality of graphic hooks 82 which engage in openings of grommets G1 of the graphics G. The body 81 of each graphic clip 80 also includes a stem 83 having a through bore 84 therethrough which is received in the opening (unnumbered) of the hub 12 and seats within the counterbore 62 of the ear 58. In this case the pin 66 additionally passes through the through bore 84 of the stem 83 of the graphic mounting clip or graphic clip 80 and, therefore, additionally not only secures the stabilizing foot 50 to the ears 12, 13 but also secures the clip 80 to the hub 12.

Although only a preferred embodiment of the invention has been specifically illustrated and described herein, it is to be understood that minor variations may be made in the apparatus without departing from the spirit and scope of the invention, as defined in the appended claims.

What is claimed is:

1. An exhibit stand comprising a plurality of generally polygonal frames constructed from a plurality of interconnected relatively movable rods, each frame being foldable from a collapsed inoperative condition to an erected operative condition in generally spaced upstanding adjacent relationship to each other, said exhibit stand including at least two pair of aligned rings pivotally connected to rods along a bottom edge of said exhibit stand, each pair of aligned rings defining a pair of spaced aligned openings, an elongated base disposed in underlying transverse relationship adjacent each pair of openings, each said elongated base having a pair of ears disposed in upstanding spaced relationship thereto, each of said ears having an opening, means for connecting a pair of ear openings to a pair of ring openings, and said connecting means being a pin fastened through the openings of associated pairs of rings and ears.

2. The exhibit stand as defined in claim 1 wherein each said base is a relatively narrow hollow tube.

3. The exhibit stand as defined in claim 1 wherein each said pair of ears are formed as ends of a generally shallow U-shaped member.

4. The exhibit stand as defined in claim 1 including a clip for securing graphics to said exhibit stand in association with at least selected ones of said ears, and each said clip being secured to its selected one ear by the associated pin.

5. The exhibit stand as defined in claim 4 wherein each said clip includes an opening receiving the associated pin.

6. The exhibit stand as defined in claim 4 wherein each clip includes a stem received in an opening of an associated ear, each said stem includes a bore, and each said stem bore receives an associated pin.

7. The exhibit stand as defined in claim 5 wherein each clip includes a stem received in an opening of an associated ear, each said stem includes a bore, and each said stem bore receives an associated pin.

8. An exhibit stand comprising a relatively upright frame adapted to have graphics attached thereto, said frame having a lower edge, means for forming at least one opening at said lower edge, at least one foot for stabilizing said frame, said foot having an ear and an opening therethrough aligned with said lower edge opening, a clip, said clip having means for securing graphics thereto, said clip further including a body and a stem, a bore through said body and stem, and means passing through said bore, said lower edge opening and said ear opening for securing said clip and foot to said frame.

9. The exhibit stand as defined in claim 8 wherein said upright frame includes a plurality of rods pivotally connected to at least one ring and said lower edge opening is defined by said at least one ring.

* * * * *